(No Model.) 3 Sheets—Sheet 1.
B. LJUNGSTRÖM.
VEHICLE WITH THREE OR MORE WHEELS.
No. 561,330. Patented June 2, 1896.
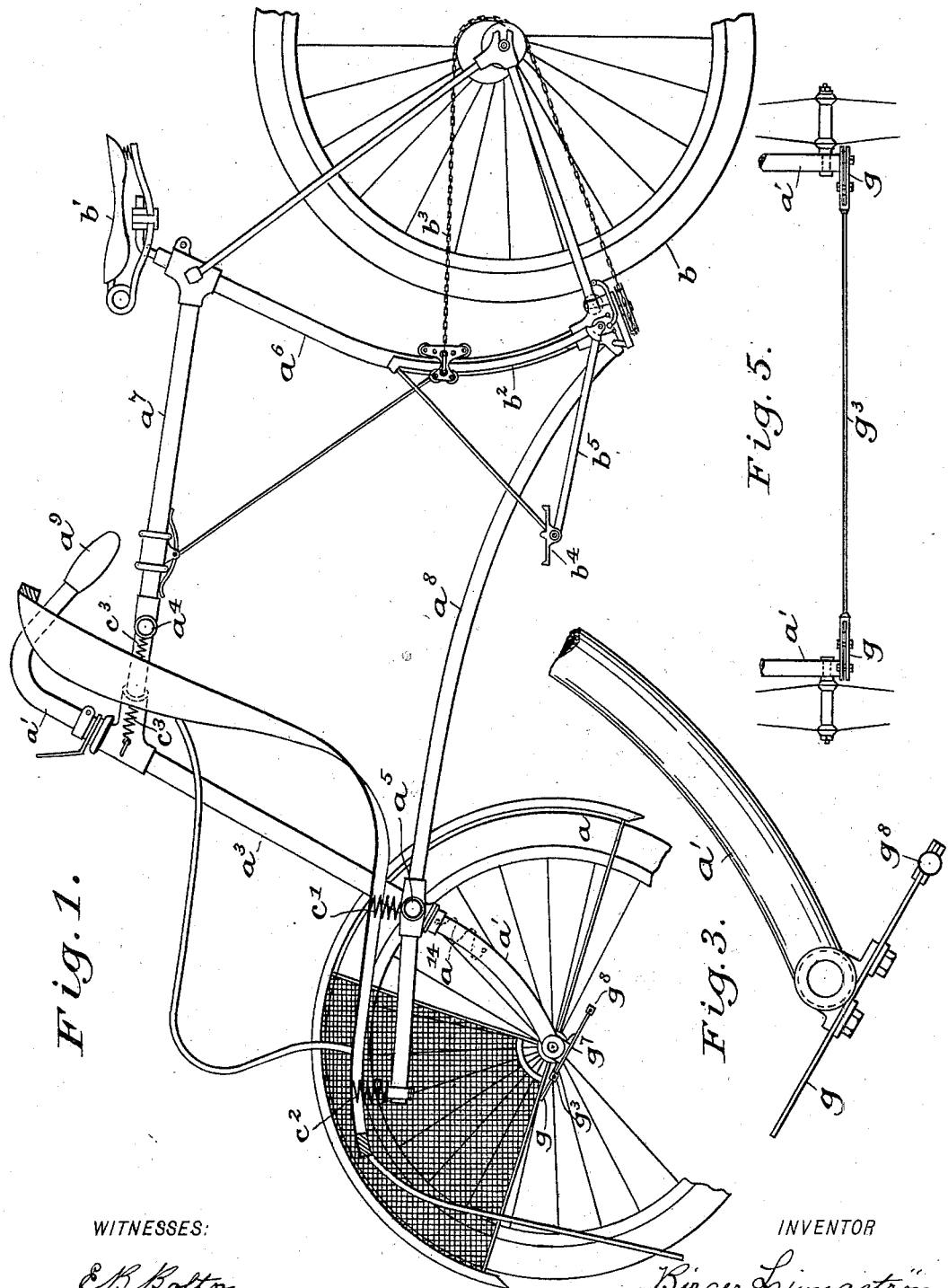
WITNESSES:
INVENTOR (No Model.) 3 Sheets—Sheet 2.
B. LJUNGSTRÖM.
VEHICLE WITH THREE OR MORE WHEELS.
No. 561,330. Patented June 2, 1896.
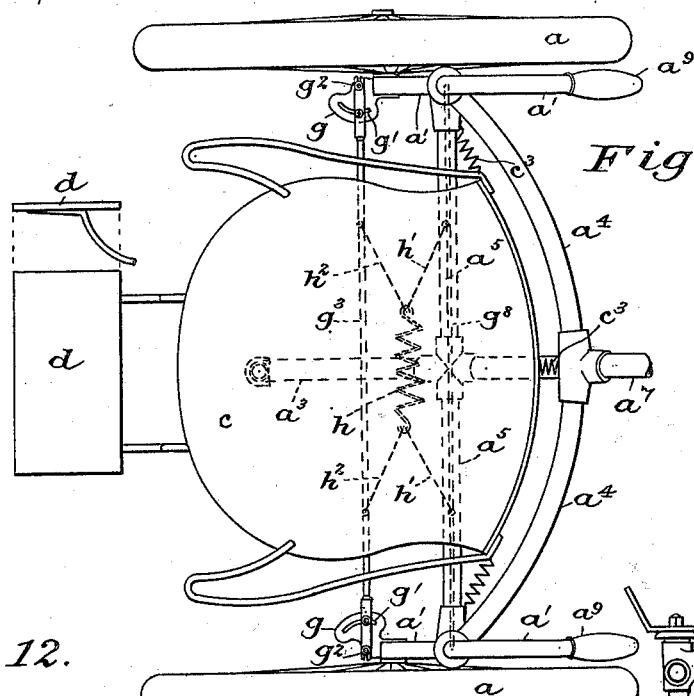
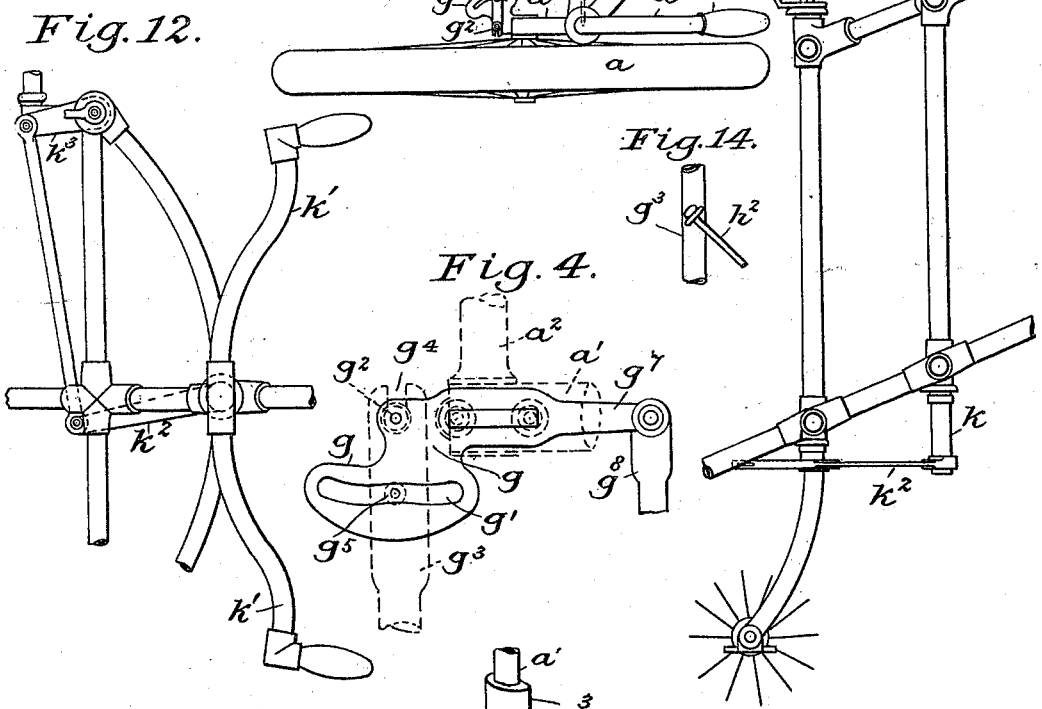
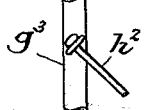
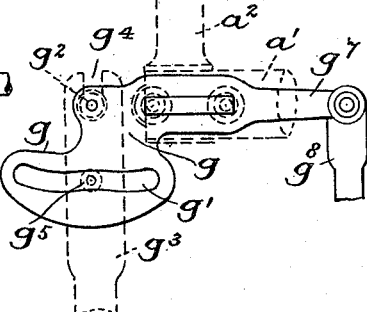
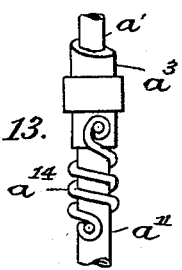
WITNESSES:
E. B. Bolton
E. K. Sturtevant
INVENTOR
Birger Ljungström
BY Richards
ATTORNEYS

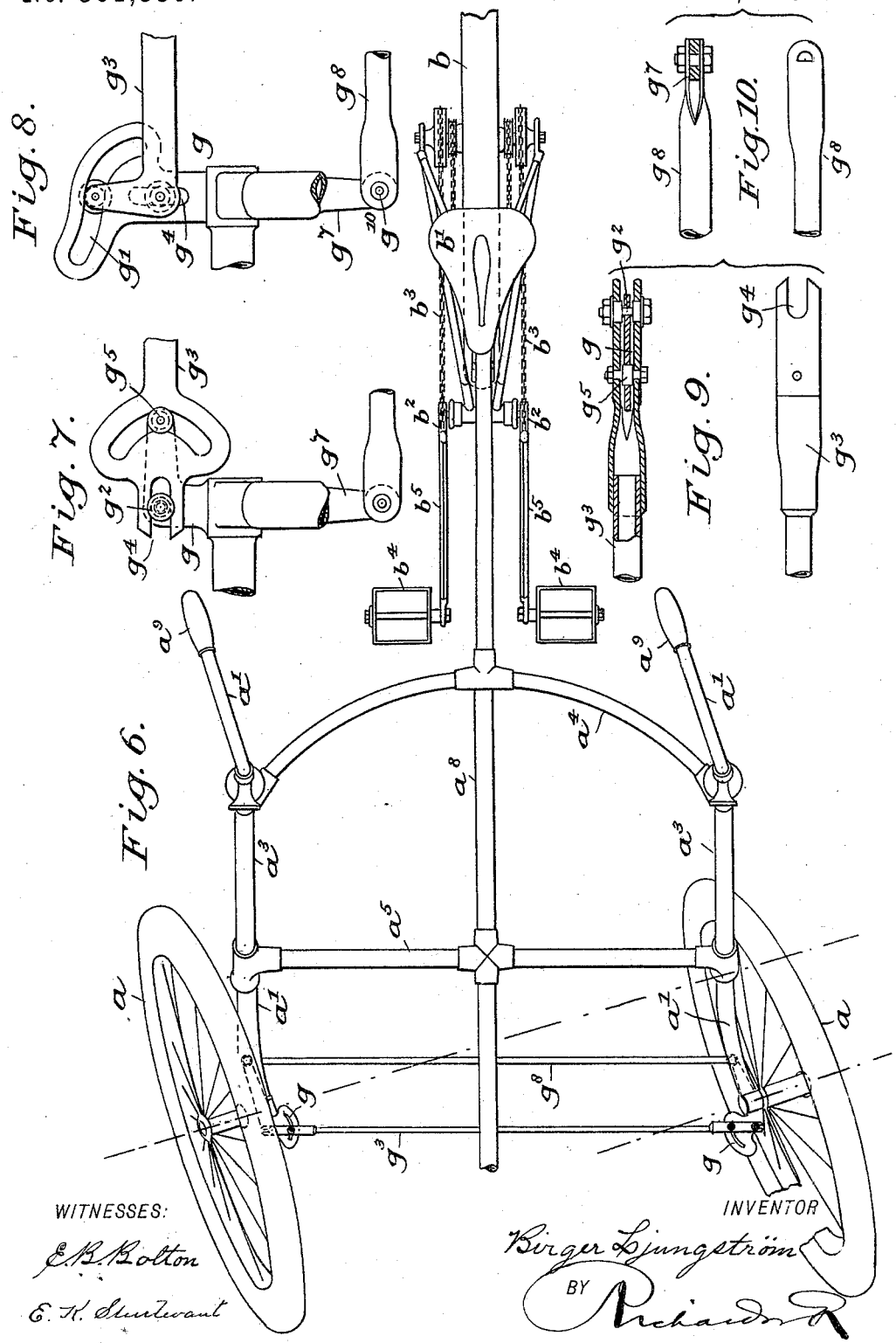

UNITED STATES PATENT OFFICE.

BIRGER LJUNGSTRÖM, OF STOCKHOLM, SWEDEN.

VEHICLE WITH THREE OR MORE WHEELS.

SPECIFICATION forming part of Letters Patent No. 561,330, dated June 2, 1896.

Application filed July 1, 1895. Serial No. 554,557. (No model.)

*To all whom it may concern:*

Be it known that I, BIRGER LJUNGSTRÖM, mechanician, a subject of the King of Sweden and Norway, and a resident of Grefgatan, 44$^b$, Stockholm, in the Kingdom of Sweden, have invented certain new and useful Improvements in Vehicles with Three or More Wheels, of which two steering-wheels are abreast, of which the following is a specification, reference being had therein to the accompanying drawings.

This invention relates to vehicles having three or more wheels and which are easy to steer at the same time as they are easy to drive in consequence of their light construction. The driving can take place by treading, by means of a motor, or in another manner. For the steering the vehicle is provided with two steering-wheels placed abreast and of which each can be turned almost as the steering-wheel of a bicycle—that is to say, each steering-wheel is with its shaft fixed to a standard, which is revoluble with respect to the frame and provided with handles. Thus it is possible for the steering-in curves to turn the steering-wheels in different degrees by the aid of the standards, so that their shafts are brought into positions converging toward the center of the curve, so that the plane of the wheel and the line which the wheel has to follow coincide accurately, whereby slipping is avoided. The standards are preferably connected to each other in such a manner that the above-mentioned difference between the revolution of the standards takes place automatically.

On the accompanying drawings is shown a machine arranged to be driven by treading, although a motor or another motive power may be employed for driving the same.

Figure 1 shows a side view of the vehicle with the one steering-wheel removed, and Fig. 2 a plan of the fore part of the same. Fig. 3 shows the lower part of a standard; Fig. 4, a top view of a detail fixed to the standard, and Fig. 5 a front view of the connection between the standards. Fig. 6 is a plan of the vehicle while running in a curve. Figs. 7 and 8 show a modification of the connection between the standards; Figs. 9 and 10, details, and Figs. 11 and 12 a steering arrangement for actuating the standards.

The two fore wheels $a$ are the steering-wheels and the hind wheel $b$ the driving-wheel. The steering-wheels are fixed to the revoluble standards $a'$, from the lower parts of which their shafts $a^2$ extend outward, Fig. 4. The standards pass through the bearings $a^3$, which are connected by cross-pieces $a^4 a^5$, in their turn connected to the back standard $a^6$ by means of bars $a^7 a^8$, respectively. Thus the parts $a^3$ to $a^8$ form the frame. The standards $a'$ are bent forward below and backward above and are provided with handles $a^9$, which are seized by the person sitting on the saddle $b'$ and treading the machine. The tread mechanism may be arranged according to the Patent No. 556,545, (application Serial No. 510,997, of May 12, 1894,) consisting of treadles having the shape of bell-crank levers, along the one arm $b^2$ of which the driving-chain $b^3$ can be moved, while the foot-plate $b^4$ is fixed to the other arm $b^5$. Between the standards $a'$ is arranged the fore seat $c$ with the foot-rest $d$. The fore seat rests on the springs $c' c^2$, of which the former is fixed to the cross formed by the parts $a^5$ and $a^8$ and the latter to the forward extended end of the last-mentioned part. At the sides the fore seat is carried by the springs $c^3$, fixed to the parts $a^3$ and $a^4$. The above-mentioned connection between the standards, which connection forces the standards to turn in different degrees at the steering-in curves, is constructed as follows:

At a point on each standard, preferably below, are fixed two projections directed forward. These projections are provided with a slot $g'$ and a pivot $g^2$. The slot is nearly straight, wherefore its ends are farther away from the pivot $g^2$ than its middle. The projections $g$ are clasped by the bar $g^3$, Figs. 5 and 9, which is forked at both its ends and extends between the standards, and which has notches $g^4$ for the penetrating-pivot $g^2$ and rollers or pivots $g^5$, entering into the slots $g'$.

From what has been said it is evident that the distance between the pivots $g^2$ must be increased at the turning of the standards to either side—for instance, from the position shown in Fig. 2 to the position shown in Fig. 6—as the distance between the pivots $g^5$ is constant; but the distance between the slot $g'$ and the pivot $g^2$ in line with the pivots $g^5$ increases at the turning. The projections are thus brought to swing out a little from each other, and consequently the wheels $a$ occupy backwardly-converging positions, or, in other words, the extensions of their shafts will come to intersect each other in or near the center of the curve. For obtaining a better steering the projections $g$ are extended backward, so as to form arms $g^7$, between which passes the bar $g^8$. The bar and the arms are pivotally connected to each other, and the point of connection $g^{10}$ is situated in line with the straight part of the standard $a'$. Instead of the slots $g'$ may be employed guides, forming the curved inner border of the projections $g$, or the slots may be arranged on the bar $g^3$ and the pivot $g^5$ may be fixed to the part $g$. The latter modification is shown in Fig. 7. In this case the slot at its ends approaches to the pivot $g^2$. Consequently the pivot $g^2$ must move outward if the pivot $g^5$ moves toward the end of the slot. As to the pivot $g^2$ and the notch $g^4$, these parts may evidently be modified in such a manner that the pivot is fixed to the bar and the notch made in the projection. Fig. 8 shows another modification, in which the slot $g^4$ runs along the projection and the slot $g'$ has such a shape that the bar $g^3$ is pushed out from the standards (the points $g^{10}$) at its one end and brought in toward the standards at its other end.

The wheels $a$ tend by themselves to occupy the positions shown in Fig. 2. This is attained by the spiral spring $h$, which at its ends is connected to the bar $g^8$ by links $h'$, and to the bar $g^3$ by other links $h^2$. The links pass through eyes fixed in the bars, and are beyond the eyes provided with heads, which at the position in Fig. 2 are quite near to the eye—that is to say, the spring is somewhat strained, (stretched.) The links $h'$ and $h^2$ may be compared to the diagonals in the parallelogram formed by the bars $g^3$ and $g^8$ and the parts situated at the ends of said bars. When the wheels (the standards $a'$) are turned in the one or the other sense, the one or the other of the diagonals is stretched—that is to say, the spring is stretched by two of the links $h'$ and $h^2$. The other links $h'$ and $h^2$ slide out a little through the eyes. Instead of employing the links $h'$ $h^2$ and the spring $h$ spiral springs $a^{14}$, wound around the standards and having their one end fixed to the standard and their other end to the standard-fastening $a^3$, may be employed. When the standards are turned sidewise for steering, the springs are strained.

Figs. 11 and 12 show a steering arrangement, serving to actuate the standards when these are not provided with steering-handles. The arrangement consists of a shaft $k$ with steering-handles $k'$. The shaft is provided with an arm $k^2$, which by means of a link is connected to an arm $k^3$, projecting from the one standard. If the shaft is turned in the one or the other direction, the standard also must be turned.

Having now described my invention, what I claim as new, and desire to secure by Letters Patent, is—

1. In combination, the independent steering-standards, the wheels journaled at the lower ends thereof, the bars or projections secured at the lower ends of the standards, a rod having its ends pivotally connected with the bars, and a second rod having its ends connected by a cam-groove and pivot connection with said bars, whereby the wheels are turned simultaneously but to different degrees substantially as described.

2. In combination, the steering-standards having steering-wheels journaled in the lower ends thereof, the two rods connecting said standards, and the yielding diagonal-stays between said rods, substantially as described.

3. In a polycycle having two steering-wheels, the combination with the steering-standards, the two rods connecting said standards, the diagonal-stays, and the spring connecting the inner ends of said stays, substantially as described.

In witness whereof I have hereunto signed my name in the presence of two subscribing witnesses.

BIRGER LJUNGSTRÖM.

Witnesses:
ERNST SVANQVIST,
A. F. LUNDBORG.